INVENTORS
Byron A. Ginocchio
Ralph W. Rodgers
BY
ATTORNEYS

Aug. 21, 1956   B. A. GINOCCHIO ET AL   2,759,369
ADJUSTING MECHANISM FOR IRRIGATION VALVE
Filed April 21, 1951   3 Sheets-Sheet 3

INVENTORS
*Byron A. Ginocchio*
*Ralph W. Rodgers*
BY
ATTORNEYS

United States Patent Office 2,759,369
Patented Aug. 21, 1956

2,759,369

ADJUSTING MECHANISM FOR IRRIGATION VALVE

Byron A. Ginocchio and Ralph W. Rodgers, Turlock, Calif.

Application April 21, 1951, Serial No. 222,276

1 Claim. (Cl. 74—520)

This invention relates in general to improvements in an irrigation valve of the type which includes a vertically adjustable valve plate cooperating with a base ring or seat secured on the upper end of a riser of an underground irrigation system.

The major object of this invention is to provide a novel mechanism, in an irrigation valve of the type described, for vertically adjusting the valve plate between open and closed positions, and to releasably lock said valve plate in any selected position of adjustment; such mechanism being fast acting and readily manually operated.

Another important object of the invention is to provide mechanism, as in the preceding paragraph, which includes a novel hand lever actuated linkage assembly; there being a vertically slidable shaft which carries the movable valve plate, and said linkage assembly being connected between the main frame of the valve and such shaft.

An additional object of the invention is to provide a mechanism, as above, wherein the linkage assembly is arranged to break beyond dead center to positively lock the valve plate against accidental opening under the influence of the water pressure to which the valve is subjected A still further object of the invention is to provide a novel connection between the valve plate and the vertical shaft.

It is also an object of the invention to provide an irrigation valve which is designed for ease and economy of manufacture; the valve being simple but sturdy in construction, and requiring a minimum of maintenance or servicing.

It is also an object of the invention to provide a practical and reliable irrigation valve, and one which will be exceedingly effective for the purpose for which it is designed.

These objects are accomplished by means of such structure and relative arrangement of parts as will fully appear by a perusal of the following specification and claim.

Figure 1:
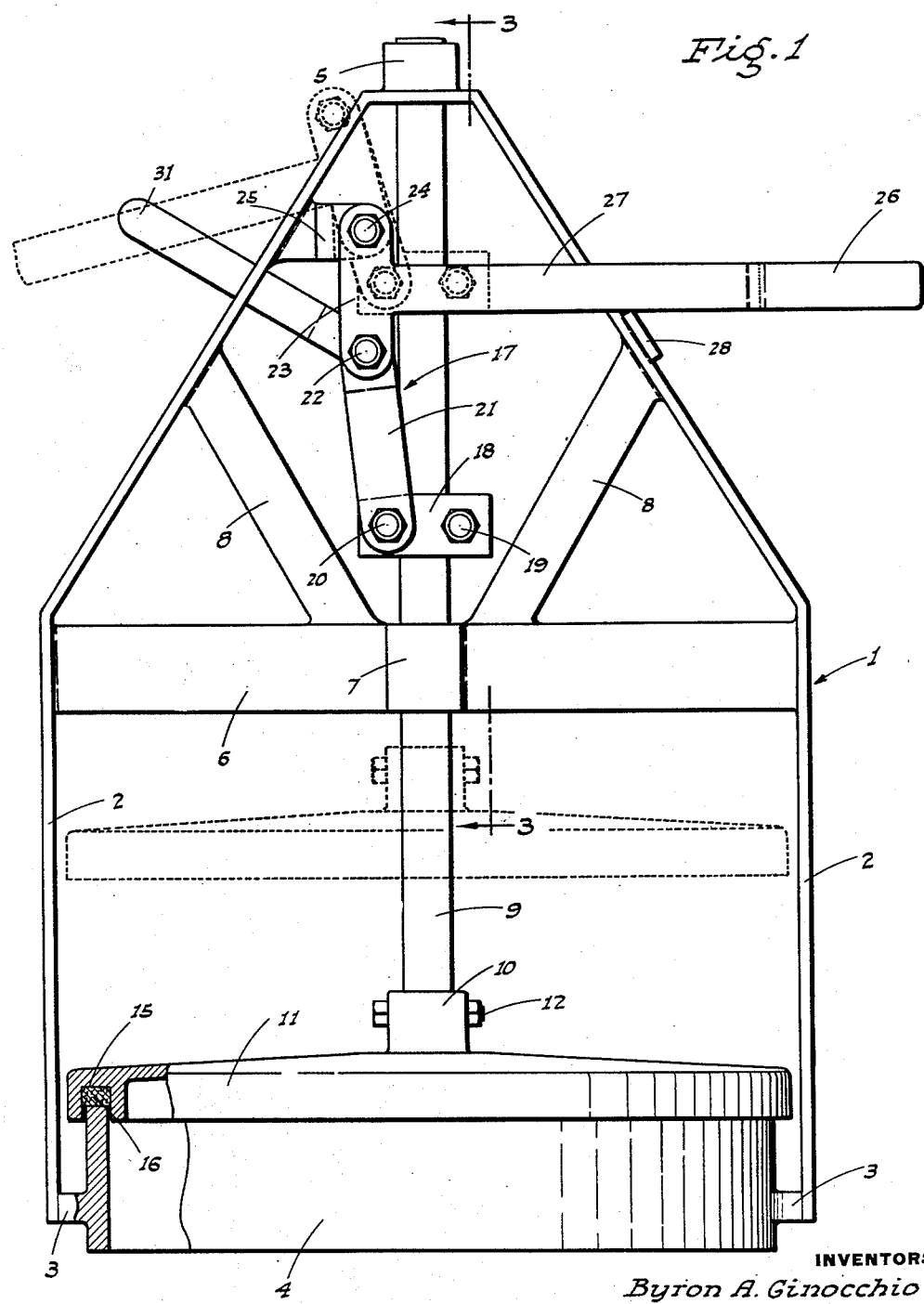
Fig. 1 is a side elevation of the valve in closed position, the full-open position being shown dotted.

Referring now more particularly to the characters of reference on the drawings, the novel irrigation valve comprises a vertical mounting frame, indicated generally at 1, such frame including upstanding side bars 2 rigidly affixed at their lower ends to integral projections 3 on opposite sides of a horizontal base ring or seat 4.

The upstanding side bars 2 are parallel for substantially their lower half and thence converge toward each other and connect at the upper end to a vertical axis guide collar 5.

A cross bar 6 connects between the upstanding side bars 2 substantially centrally of their ends, and such cross bar includes at the center a vertical axis guide collar 7. Diagonal braces 8 extend between the upper half portions of the side bars 2 and the cross bar 6, as shown. A vertical shaft 9 slidably extends through the guide collars 5 and 7 and projects downwardly some distance below the cross bar 6.

At its lower end the shaft 9 is engaged in a socket 10 formed centrally on a circular valve plate or lid 11.

Figure 4:
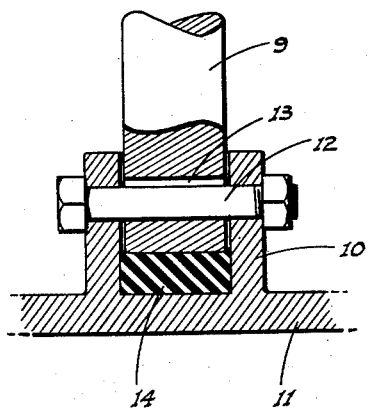
Fig. 4 is an enlarged fragmentary sectional elevation of the connection between the valve plate and shaft.
Figure 5:
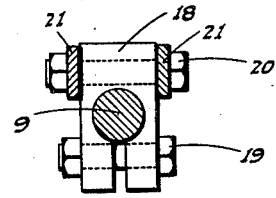
Fig. 5 is a fragmentary sectional plan on line 5—5 of Fig. 3.

The shaft 9 is secured in the socket 10 by a cross bolt 12 which extends from side to side of said socket passing in loose play relation through a cross bore 13 in said shaft; there being a rubber block 14 engaged under compression between the lower end of the shaft 9 and the bottom of the socket 10. See Fig. 4.

With the foregoing connection between the shaft 9 and lid 11, the latter is secured in stable relation to such shaft but is capable of limited rocking motion whereby to assure of proper full circular engagement of the lid 11 with the seat 4 when the valve is closed, as in Fig. 1.

As shown in such figure, the lid 11 includes, adjacent the periphery, an annular downwardly opening channel 15 having a seal 16 therein; such seal preferably being of braided jute. When the valve is closed, the upper end of the seat 4 projects into the channel 15 in positive engagement with the seal 16.

The lid 11 is adjusted between open and closed positions by means of the following novel mechanism:

A toggle link assembly 17 is connected between an upper portion of the frame 1 and the shaft 9, serving, when manipulated, to cause the shaft 9 to raise or lower, whereby to open or close, respectively, the lid 11.

The toggle link assembly 17 comprises a clamped-on vertically adjustable connector block 18 secured in place by a cross bolt 19. At the end of the connector block 18, opposite the cross bolt 19, there is another cross bolt 20 which serves as the pivot for the lower ends of a pair of transversely spaced bottom links 21. From the cross bolt 20 the bottom links 21 extend upwardly with some divergence and are connected at their upper ends by pivot bolts 22 to the lower ends of corresponding, upper links 23. At their upper ends the links 23 are pivoted by bolts 24 to rigid attachment ears 25, which project inwardly from the upper portion of one of the side bars 2, with considerable divergence.

Figure 2:
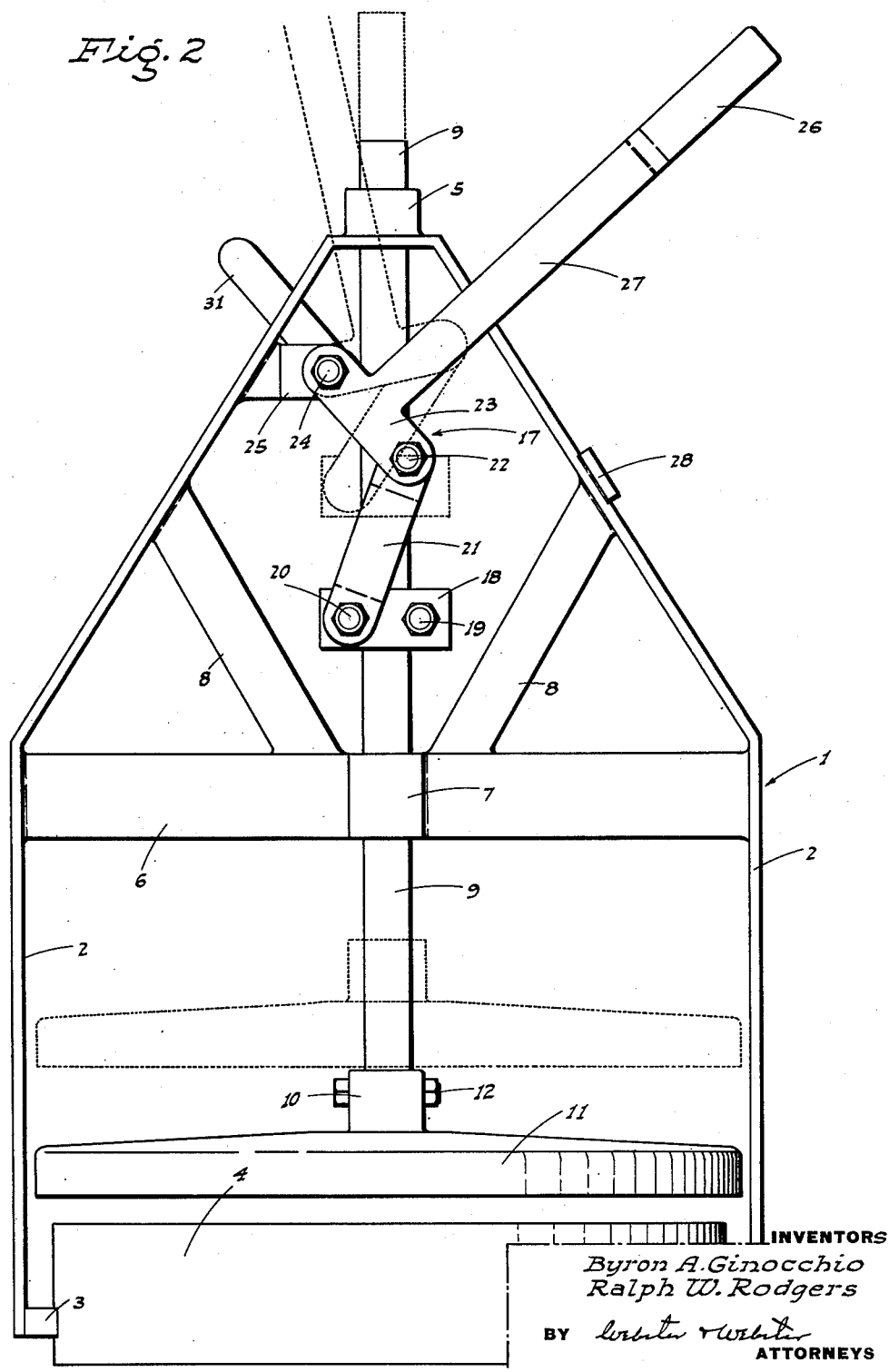
Fig. 2 is a similar view of the valve in an open position.
Figure 3:
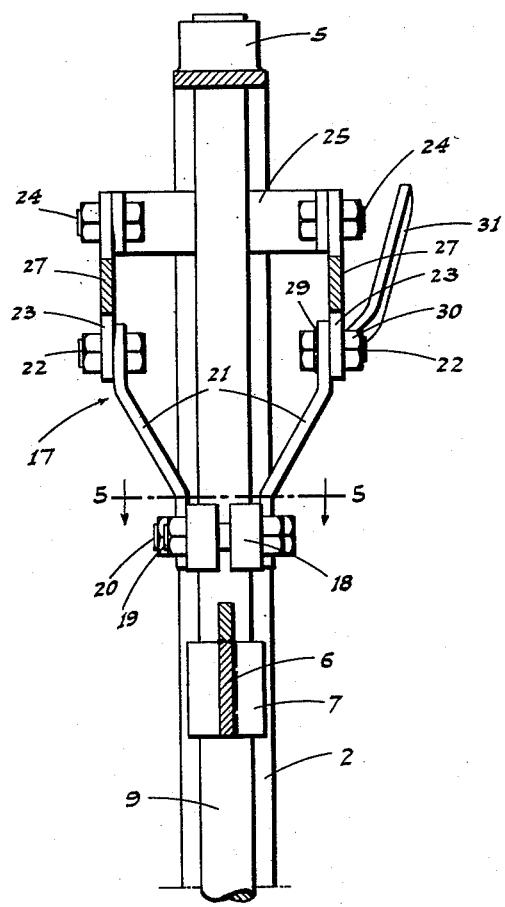
Fig. 3 is a fragmentary sectional elevation on line 3—3 of Fig. 1.

The numeral 26 indicates a hand lever whose inner end portion is forked, as at 27; the legs of the fork being integral at their inner ends with corresponding upper links 23 centrally of the ends of latter and at right angles thereto. With this arrangement, the hand lever 26 is vertically swingable between a lowered substantially horizontal position in engagement with a stop 28 on frame 1 and an up-swung position, as in Fig. 2.

When the valve plate or lid 11 is in an open position, the toggle link assembly 17 is disposed with the bottom links 21 and the upper links 23 broken in a direction toward the stop 28; the hand lever 26 then being in an up-swung position, as aforesaid.

The connector block 18 is adjusted to a position on the vertical shaft 9 such that when the hand lever 26 is swung downwardly against the stop 28, the toggle link assembly 17 passes dead center, as in Fig. 1, and then exerts a powerful down-thrust on the shaft 9 effectively engaging the lid 11 in non-leak relation with the seat 4.

When it is desired to open the valve to permit irrigation water to flow through, and out of, the seat 4, the latter being secured to the upper end of a riser of the underground irrigation system, the hand lever 26 is engaged and swung upwardly. This breaks the toggle link assembly 17 over dead center in the direction of the stop 28. After such toggle link assembly is thus broken beyond dead center, continued swinging of the hand lever 26 causes the shaft 9 and lid 11 to raise, water then flowing from the valve. When the lid 11 reaches the desired open position, the toggle link assembly 17 is locked up as follows:

One of the pivot bolts 22 is welded at the head, as at 29, to the corresponding link 21 while the nut 30 on such bolt is formed with a handle 31 which radiates therefrom.

When the lid 11 is set to the desired position, by manipulation of the hand lever 26, the handle 31 is used to effectively tighten the nut 30, thus clamping the adjacent bottom link 21 and upper link 23 together in non-movable relation. As so locked up, the toggle link assembly 17 holds the vertical shaft 9 and lid 11 against motion in either direction, especially against that which would otherwise result from the pressure of the water as exerted on the underside of the lid 11.

With the described mechanism, the lid 11 of an irrigation valve of the type described may be positively locked in closed position, or in a selective open position by the simple manipulation of the hand lever 26 and handle 31.

A further advantage of the described mechanism is that it is fast acting, it requiring only a moment to open or close the valve.

If it is desired to maintain the valve fully open, this may be done without the use of lock nut 30 by merely swinging the handle fully up and over to the position shown in dotted lines in Fig. 1, in which the lower links 21 then lean back and bear against the back cross-wall which connects the attachment ears 25, and the weight of the valve cannot then be effective to swing the linkage in a direction to close the valve until the linkage is manually swung forward somewhat.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

Mechanism for shifting a vertical valve shaft axially, said mechanism comprising, with a fixed frame above the valve having upstanding side elements on opposite sides of and transversely alined with the shaft, pairs of upper and lower toggle links extended when the valve is closed and spaced apart a distance greater than the width of the frame elements and disposed when the links are extended between the shaft and one side element, means separately pivoting the links of the pairs together at their adjacent ends, means pivoting the upper links at their upper end in connection with said one frame element, means pivoting the lower pair of links at their lower end on the shaft, a handle lever normally projecting beyond the opposite side element of the frame and including fork portions spaced apart to straddle the frame elements and shaft and rigidly connected to and projecting at an angle from the upper links, and vertically spaced bearings for the shaft mounted on the frame above and below the toggle links and through which the shaft is slidable; the length of the fork portions of the lever being such that the lever may swing over the upper end of the shaft and the upper bearing without interference.

References Cited in the file of this patent
UNITED STATES PATENTS

| Number | Name | Date |
|---|---|---|
| 52,957 | Bridge | Mar. 6, 1866 |
| 373,522 | Giles | Nov. 22, 1887 |
| 398,785 | Kennedy | Feb. 26, 1889 |
| 772,418 | Knight | Oct. 18, 1904 |
| 1,071,294 | Brown | Aug. 26, 1913 |
| 1,110,977 | Welch | Sept. 15, 1914 |
| 1,296,897 | Yoeman | Mar. 11, 1919 |
| 1,404,406 | Prouty | Jan. 24, 1922 |
| 1,437,576 | Webber | Dec. 5, 1922 |
| 1,537,505 | Smith | May 12, 1925 |
| 1,877,589 | Reed | Sept. 13, 1932 |
| 2,231,630 | Laddon | Feb. 11, 1941 |
| 2,244,100 | Cole | June 3, 1941 |
| 2,248,381 | Pedersen | July 8, 1941 |
| 2,382,562 | Harvey | Aug. 14, 1945 |
| 2,497,860 | Brown | Feb. 21, 1950 |
| 2,515,159 | Zurcher | July 11, 1950 |
| 2,539,076 | Harris | Jan. 23, 1951 |
| 2,571,487 | Rolfe | Oct. 26, 1951 |
| 2,574,281 | Olson | Nov. 6, 1951 |